Patented Aug. 23, 1932

1,873,296

UNITED STATES PATENT OFFICE

ROY CROSS, OF KANSAS CITY, MISSOURI, ASSIGNOR TO SILICA PRODUCTS COMPANY, OF KANSAS CITY, MISSOURI, A CORPORATION OF DELAWARE

IMPROVING CLAY

No Drawing.   Application filed September 23, 1929. Serial No. 394,736.

This invention relates to improving clays; and it comprises a method of enhancing the colloid properties of clay with conversion of non-swelling clays into swelling clays, wherein the clay is treated with small amounts of freshly produced reactive hydrated calcium (or magnesium) silicate, as for instance by admixing minimum proportions of sodium silicate with clay containing calcium compounds to produce calcium silicate therein; and it also comprises certain products of said method; all as more fully hereinafter set forth and as claimed.

This application is a continuation in part of certain prior and copending applications; these applications being Ser. No. 76,120, Dec. 17, 1925 and Ser. No. 268,800, April 8, 1928.

As is well known, the various natural clays consist for the most part of hydrated silicates of aluminum but they differ widely in properties. The difference in properties is ascribed more to differences in the state of aggregation of the ultimate particles than to any chemical difference. The swelling clays, of which bentonite is the best known example, in the presence of water swell and, so to speak, slake, giving a jelly-like mass. Some bentonites will give a highly viscous mixture with as high as 30 times their own weight of water. Ordinary clays do not have this swelling property in any degree comparable with that of bentonite and some, like kaolin, hardly swell at all.

It is the purpose of the present invention to convert non-swelling clays and those which swell very little into materials analogous to bentonite and useful for the same purpose. The resultant product is not bentonite; but it is analogous and is useful for much the same purposes. The swelling action with bentonite is strictly reversible, the swollen clay on drying and rewetting, swelling once more. With the products made under the present invention, this reversibility in general does not occur; the swollen products on drying being incapable of redeveloping a gel. In the acknowledged prior applications, improvements in the colloid qualities of clay is effected by admixture of Portland cement with the clay and it is pointed out that a similar addition can be made to bentonite of poor grade with improvement in its quality.

One of the main constituents of Portland cement is calcium silicate in a highly reactive form; a form readily hydrating with water. In the clinker the silicate is highly basic; that is the ratio of CaO to $SiO_2$ is high. On wetting with water hydrolytic changes occur with production of various calcium silicates. But little is certainly known as to these reactions but tricalcium silicate is formed from the more basic materials of the clinker.

In the present invention less-basic calcium silicates are formed by wet methods and incorporated with the clay to be improved. As many clays contain more or less calcium in the form of calcium carbonate, calcium silicate may be formed, so to speak, in place by incorporating into the clay an amount of sodium silicate, or water glass, equivalent to the amount of calcium present. Some variance either way is immaterial. Or, sodium silicate solution and calcium chlorid solution may be mixed to produce calcium silicate and this employed. Ordinarily it is best to remove the mother liquor which is a solution of sodium chlorid, but this is not always necessary.

Another way of obtaining reactive forms of calcium silicate useful in the present invention is to fuse silica or a silicate with soda ash (sodium carbonate). The soda ash opens up the silica or silicate. The resulting melt is treated with calcium chlorid or magnesium chlorid. Or, a calcium or magnesium compound may be directly admixed with the silica and soda ash prior to fusion. Where silica itself is fused with soda ash, without admixed alkali earth material, the product is water glass; but where silicates such as clays, slates, leucite, etc. are fused with soda ash the resultant product is more complicated and contains not only sodium silicate but other silicates. Instead of using alkali carbonate for opening up a mineral, caustic alkali, or alkali bisulfates, fluorids, phosphates, etc., may be used.

In a typical embodiment of the present invention using the just described method of opening up a silicate, sodium carbonate or soda ash is thoroughly mixed with clay, advantageously of a colloidal character, in the proportion of one molecular equivalent of sodium oxide to four molecular equivalents of silica. This mixture is then fused. The fused material is ground to a high state of fineness, preferably passing a 200-mesh screen. A molecular equivalent of material containing an alkaline earth metal compound, advantageously a soluble salt of such a metal, is intimately ground with the mixture. On wetting, reaction takes place. For purification the wet mixture may be drained and washed or dialyzed with water through a membrane. Washing or dialysis removes water-soluble materials. If, for example, calcium chlorid is used as the alkali earth salt, then the calcium replaces the sodium in the mass, giving sodium chlorid which remains in solution. A removal of the sodium chlorid considerably improves the character of the synthetic material for many purposes. The residual wet mixture from which saline matter has been extracted may, if so desired, be dried and packaged, stored or marketed. A small addition to any clay will give a swelling product; a material swelling like bentonite but forming an irreversible gel. With the dry commercial preparation made as described may be admixed various inert fillers. For many of the purposes for which the present preparations are to be used it is not necessary to wash or dialyze out salt. For example, in the production of oil well mud the presence of a small amount of salt is not ordinarily harmful; although it is not desirable for the best results.

Another preparation can be made by fine grinding a mixture of sodium silicate and calcium chlorid. On access of moisture reaction takes place between the two. The formation of calcium silicate prevents deliquescence.

It is to be understood that other alkali silicates than sodium silicates may be used, such as lithium silicate or potassium silicate. It is also understood that any reactive salt or water-soluble salt of alkali earth or metals may be used instead of calcium chlorid. A great variety of clays or minerals consisting largely of aluminum silicate may be used as a filler.

The present material may be used for the purposes like those set out in application Serial No. 268,800, including the following:

(1) As a plasticizing agent for masonry cement, Portland cement, high early strength cement, mortars, stuccos, concrete, gypsum cement, magnesite cement, enamels, ceramic and similar materials. For these uses this material acts not only as a plasticizer but often also as a waterproofing agent, a dispersing agent and weight lightener.

(2) In connection with foundry molding sand and in the making of cores and core washes. It gives bonding value at the same time as giving sufficient porosity.

(3) In connection with mudding in drilling of oil wells, ordinarily with rotary tools. It greatly improves the suspending qualities of the mud, preventing caving of the walls of the well, preventing corrosion, holding back gas and salt water, suspending cuttings and removing them from the drilling face, lubricating the slush pumps and the tools, suspending weighting materials and in many other ways facilitating drilling.

(4) As a suspending agent in paints and inks and in calcimines and water-colors.

(5) In the production of oil and asphalt emulsions and in the manufacture of roofing paper, curing of concrete roads, and in connection with wall board and insulating board.

(6) With soap in improving the detergent qualities of and as a substitute for soap.

(7) In connection with greases, thread-cutting compounds, water treatment, insecticides, putty, adhesives, anticorrosives, linoleum, paper manufacture and many purposes that will be apparent.

In some instances and for the purposes enumerated in this application, various combinations of clay or other inert filler such as powdered dolomite, powdered limestone and silica dust with soluble silicates may be used with satisfactory results, particularly in their application to rotary drilling of oil wells. In such cases sodium silicate or potassium silicate may be used as the colloidal agent. The sodium silicate may be used as such and incorporated with a reacting agent such as ammonium chlorid, calcium chlorid, barium chlorid or any other water-soluble metal salt.

Some of these salts act by hydrolytic action on the silicate, as is the case with ammonium chlorid, while others act as direct agents in which the metal of the salt replaces the sodium of the silicate by a metathetic exchange. By the use of alkali silicates, together with the reacting agent, it is possible to obtain very much stronger gelling action. The various methods of use would be as follows:

(1) Mixing clay, barytes, hematite or inert matter with water glass or sodium silicate, so that sodium silicate is uniformly and thoroughly dispersed throughout the mass. In a typical instance 5 per cent would be used. This is then dried so that it is not too reactive and subsequently, after drying, it is thoroughly mixed or ground with powdered ammonium chlorid, barium chlorid or any other water-soluble metal salt. Calcium chlorid may be used, but it is somewhat objectionable on account of its deliquescent nature prior to making the mixture. Anhydrous acids may also be used. The admixture described makes a sort of synthetic bentonite. More clay may be added to the mixture.

(2) In some instances, however, on account of the drying of the sodium silicate prior to reaction, it is too slowly reactive to produce a gel quickly. In other instances, the final material is hygroscopic because of premature reaction, and in others there is sack packing, which is objectionable. To obviate these difficulties it is sometimes desirable to incorporate the reactive materials in separate stages. In one stage a clay or other inert filler is incorporated with the sodium silicate, in this case using particularly highly concentrated commercial water glass. It may not be necessary to dry the material, as the clay absorbs the moisture of the solution. Another portion of clay or inert filler is mixed with the ammonium chlorid, calcium chlorid, barium chlorid or whatever reactive agent is used. The two preparations so made may be packaged in powdered form in inexpensive containers; and mixed in equal proportions when use is desired. As a typical example, one portion would contain 5 per cent of sodium silicate and the other portion would contain 3 per cent of ammonium chlorid, of calcium chlorid or of barium chlorid. Mixing should be with substances as dry as possible and water subsequently added. However, this dry mixing with subsequent wetting is not absolutely necessary. Mixing, for example, can readily be effected in the ordinary slush pond in the oil field by means of the slush pump.

(3) A third method of carrying out the process of the present invention is to make a complete mixture on the job. This involves three different packages, one containing liquid water glass, one containing a reacting agent such as a 25 per cent solution of ammonium chlorid, calcium chlorid or barium chlorid, and a third containing a sort of bodying agent such as local mud, kaolin, calcium carbonate, silex, barium sulfate, powdered hematite, powdered galena or other weighting agent. These three packages are usually made in such a way as to give the right proportion when one package of each is used.

In some instances, the presence of alkali in the synthetic gel is objectionable. For example, it is objectionable in the case of a binder for foundry sand, for cement manufacture, for paint, the manufacture of inks, waterproofing of cloth and other conditions where the presence of alkalies or water-soluble substances would have an undesirable effect. In such event materials are used leaving no alkali after reaction.

In the use of these synthetic gels for oil wells, it is highly advantageous in many cases, particularly for closing large fissures in the wells, to use the gelling agent in connection with a cellulosic, fibrous or flaky material. Among the materials that have been satisfactorily so used are bran, cottonseed hulls and sawdust. A mineral fiber or micaceous material also may be used advantageously in some cases.

What I claim is:—

1. A dry composition of matter having properties analogous to bentonite, comprising natural clay mixed with about 5 per cent by weight of sodium silicate and about 3 per cent by weight of at least one inorganic salt selected from a class comprising the chlorides of ammonium, calcium and barium.

2. In the production of a bentonite-like material, the process which comprises finely grinding the residues from the fusion of an alkali carbonate or hydroxid with a natural silicate, adding an alkaline earth metal compound and water, purifying the mixture by removing the water soluble materials, drying the product and mixing said product in minor proportions with a natural clay.

3. A composition of matter comprising a natural clay, a soluble alkaline earth metal compound and the residues of the fusion of a silicious material with an alkali metal compound selected from a group consisting of alkali metal carbonates and hydroxides, the molecular ratios of the alkali metal silicate in said residues and of the alkaline earth metal compound being approximately equal.

4. As a new material analogous to bentonite and capable of forming a viscous gel with water, a dry composition comprising a natural clay, an alkali metal silicate and a soluble alkaline earth metal compound, the last two components being in substantially equimolecular proportions.

5. The composition of claim 4 in which the soluble alkaline earth metal compound is calcium chlorid and the alkali metal silicate is sodium silicate.

In testimony whereof, I have hereunto affixed my signature.

ROY CROSS.